(12) United States Patent
Ren et al.

(10) Patent No.: US 12,483,302 B2
(45) Date of Patent: Nov. 25, 2025

(54) TRANSMISSION METHOD AND APPARATUS, DEVICE, AND READABLE STORAGE MEDIUM

(71) Applicant: VIVO MOBILE COMMUNICATION CO., LTD., Guangdong (CN)

(72) Inventors: Qianyao Ren, Guangdong (CN); Yang Song, Guangdong (CN)

(73) Assignee: VIVO MOBILE COMMUNICATION CO., LTD., Guangdong (CN)

( * ) Notice: Subject to any disclaimer, the term of this patent is extended or adjusted under 35 U.S.C. 154(b) by 26 days.

(21) Appl. No.: 18/323,615

(22) Filed: May 25, 2023

(65) Prior Publication Data

US 2023/0299821 A1    Sep. 21, 2023

Related U.S. Application Data

(63) Continuation of application No. PCT/CN2021/132676, filed on Nov. 24, 2021.

(30) Foreign Application Priority Data

Dec. 1, 2020   (CN) .......................... 202011388434.5

(51) Int. Cl.
| | |
|---|---|
| *H04L 5/12* | (2006.01) |
| *H04B 7/0456* | (2017.01) |
| *H04B 7/06* | (2006.01) |
| *H04W 72/044* | (2023.01) |

(52) U.S. Cl.
CPC ......... *H04B 7/0456* (2013.01); *H04B 7/0626* (2013.01); *H04B 7/0632* (2013.01); *H04W 72/044* (2013.01)

(58) Field of Classification Search
CPC .. H04B 7/0456; H04B 7/0626; H04B 7/0632; H04W 72/044; H04W 4/02; H04W 72/23; H04L 25/0216; H04L 5/0048; H04L 25/03898; H04L 27/2636
USPC ....................................................... 375/262
See application file for complete search history.

(56) References Cited

U.S. PATENT DOCUMENTS

| | | | |
|---|---|---|---|
| 2016/0134343 A1* | 5/2016 | Nam | H04B 7/0452 375/267 |
| 2018/0323846 A1 | 11/2018 | Tsai et al. | |
| 2019/0356405 A1 | 11/2019 | Kim et al. | |
| 2020/0052748 A1* | 2/2020 | Kim | H04B 7/0469 |

(Continued)

FOREIGN PATENT DOCUMENTS

| | | | | |
|---|---|---|---|---|
| CN | 103516494 A | * | 1/2014 | ........ H04W 72/1231 |
| CN | 109196789 A | | 1/2019 | |

(Continued)

OTHER PUBLICATIONS

Nokia, Nokia Shanghai Bell, "Enhancement on CSI measurement and reporting", GPP TSG RAN WG1 Meeting #103-e, R1-2008909, Oct. 26-Nov. 13, 2020, e-Meeting.

(Continued)

*Primary Examiner* — Helene E Tayong
(74) *Attorney, Agent, or Firm* — Price Heneveld LLP

(57) ABSTRACT

A transmission method and apparatus, a device, and a readable storage medium are disclosed. The method includes: sending, by a terminal, information for determining a position of a valid orthogonal basis and a coefficient of the valid orthogonal basis to a network side.

20 Claims, 8 Drawing Sheets

(56) References Cited

U.S. PATENT DOCUMENTS

| | | |
|---|---|---|
| 2020/0304182 A1 | 9/2020 | Ibrahim et al. |
| 2021/0258058 A1 | 8/2021 | Wu et al. |
| 2021/0273708 A1 | 9/2021 | Li et al. |
| 2021/0306048 A1 | 9/2021 | Shi et al. |
| 2022/0149909 A1 | 5/2022 | Liu et al. |

FOREIGN PATENT DOCUMENTS

| | | | |
|---|---|---|---|
| CN | 109600199 A | 4/2019 | |
| CN | 110535513 A | 12/2019 | |
| CN | 110581724 A | 12/2019 | |
| CN | 111262611 A | 6/2020 | |
| CN | 111510189 A | 8/2020 | |
| CN | 111726154 A | 9/2020 | |
| WO | WO-2013189194 A1 * | 12/2013 | ........ H04W 72/1231 |
| WO | 2019208992 A1 | 10/2019 | |
| WO | 2020119211 A1 | 6/2020 | |
| WO | 2020221581 A1 | 11/2020 | |

OTHER PUBLICATIONS

VIVO, Further discussion and evaluation on MTRP CSI and partial reciprocity, 3GPP TSG RAN WG1 #103-e, R1-2007650, e-Meeting, Oct. 26-Nov. 13, 2020.

CATT, CSI enhancements for MTRP and FR1 FDD with partial reciprocity, 3GPP TSG RAN WG1 Meeting #103-e, R1-2007830, e-Meeting, Oct. 26-Nov. 13, 2020.

Samsung, "Views on Rel. 17 CSI enhancements", 3GPP TSG RAN WG1#103-e, R1-2008154, e-Meeting, Oct. 26-Nov. 13, 2020.

* cited by examiner

|  | No. 0 | No. 1 | No. 2 |
|---|---|---|---|
| Port 0 | $a_1$ | $a_5$ | $a_9$ |
| Port 1 | $a_2$ | $a_6$ | $a_{10}$ |
| Port 2 | $a_3$ | $a_7$ | $a_{11}$ |
| Port 3 | $a_4$ | $a_8$ | $a_{12}$ |

FIG. 7

|  | No. 0 | No. 1 | No. 2 |
|---|---|---|---|
| Port 0 | $a_1$ | $a_5$ | $a_9$ |
| Port 1 | $a_2$ | $a_6$ | $a_{10}$ |
| Port 2 | $a_3$ | $a_7$ | $a_{11}$ |
| Port 3 | $a_4$ | $a_8$ | $a_{12}$ |

FIG. 8

TRANSMISSION METHOD AND APPARATUS, DEVICE, AND READABLE STORAGE MEDIUM

CROSS-REFERENCE TO RELATED APPLICATIONS

This application is a continuation application of PCT International Application No. PCT/CN2021/132676 filed on Nov. 24, 2021, which claims priority to Chinese Patent Application No. 202011388434.5 filed in China on Dec. 1, 2020, which are incorporated herein by reference in their entireties.

TECHNICAL FIELD

This application pertains to the field of communications technologies, and specifically relates to a transmission method and apparatus, a device, and a readable storage medium.

BACKGROUND

At present, in a case that uplink and downlink channels have only partial reciprocity, a network side uses only reciprocity in angular domain during design of precoding for downlink transmission.

SUMMARY

According to a first aspect, a transmission method is provided. The method includes: sending, by a terminal, information for determining a position of a valid orthogonal basis and a coefficient of the valid orthogonal basis to a network side.

According to a second aspect, a transmission method is provided. The method includes:
  receiving, by a network-side device, information for determining a position of a valid orthogonal basis and a coefficient of the valid orthogonal basis that are sent by a terminal; and
  determining, by the network-side device, precoding for downlink transmission based on the information for determining the position of the valid orthogonal basis and the coefficient of the valid orthogonal basis.

According to a third aspect, a transmission apparatus is provided. The apparatus includes:
  a first sending module, configured to send information for determining a position of a valid orthogonal basis and a coefficient of the valid orthogonal basis to a network side.

According to a fourth aspect, a transmission apparatus is provided. The apparatus includes:
  a second receiving module, configured to receive information for determining a position of a valid orthogonal basis and a coefficient of the valid orthogonal basis that are sent by a terminal; and
  a second determining module, configured to determine precoding for downlink transmission based on the information for determining the position of the valid orthogonal basis and the coefficient of the valid orthogonal basis.

According to a fifth aspect, a terminal is provided. The terminal includes: a processor, a memory, and a program stored on the memory and capable of running on the processor, where when the program is executed by the processor, the step of the method according to the first aspect is implemented.

According to a sixth aspect, a network-side device is provided. The network-side device includes a processor, a memory, and a program stored on the memory and capable of running on the processor, where when the program is executed by the processor, the steps of the method according to the second aspect are implemented.

According to a seventh aspect, a readable storage medium is provided. The readable storage medium stores programs or instructions, where when the programs or instructions are executed by a processor, the steps of the method according to the first aspect or the second aspect are implemented.

According to an eighth aspect, a program product is provided. The program product is stored in a non-volatile storage medium, and the program product is executed by at least one processor to implement the steps of the method according to the first aspect or the second aspect.

According to a ninth aspect, a chip is provided. The chip includes a processor and a communication interface, the communication interface is coupled to the processor, and the processor is configured to run programs or instructions to implement the method according to the first aspect or the second aspect.

BRIEF DESCRIPTION OF DRAWINGS

FIG. 7 is a first schematic diagram of a correspondence between each position of a port and an orthogonal basis according to an embodiment of this application;

FIG. 8 is a second schematic diagram of a correspondence between each position of a port and an orthogonal basis according to an embodiment of this application;

DESCRIPTION OF EMBODIMENTS

The technical solutions in the embodiments of this application are described below clearly with reference to the accompanying drawings in the embodiments of this application. Apparently, the embodiments described are some rather than all of the embodiments of this application. All other embodiments derived by persons of ordinary skill in the art based on the embodiments of this application without creative efforts fall within the scope of protection of this application.

The terms such as "first" and "second" in the specification and claims of this application are used for distinguishing similar objects, but are not necessarily used for describing a specified sequence or order. It should be understood that the data termed in such a way is interchangeable in proper circumstances so that the embodiments of this application described herein can be implemented in an order other than the order illustrated or described herein. In addition, "first" and "second" are generally used to distinguish objects of the same category, rather than to define the number of objects. For example, there may be one first object or a plurality of first objects. Moreover, "and/or" used in the specification and claims means at least one of the connected objects, and the character "/" generally indicates an "or" relationship between the associated objects.

It should be noted that the technology described in the embodiments of this application is not limited to a long term evolution (LTE)/LTE-advanced (LTE-A) system, and may also be used in other wireless communications systems, such as code division multiple access (CDMA), time division multiple access (TDMA), frequency division multiple access (FDMA), orthogonal frequency division multiple access (OFDMA), single-carrier frequency-division multiple access (SC-FDMA), and other systems. The terms "system" and "network" in the embodiments of this application are generally interchangeable. The technology described may be used in the above-mentioned systems and radio technologies as well as other systems and radio technologies. However, a new radio (NR) system is described in the following description by way of example, and an NR terminology is used in most of the following description. The technologies can also be applied to applications other than the NR system application, such as a 6th generation (6$^{th}$ Generation, 6G) communications system.

Figure 1:
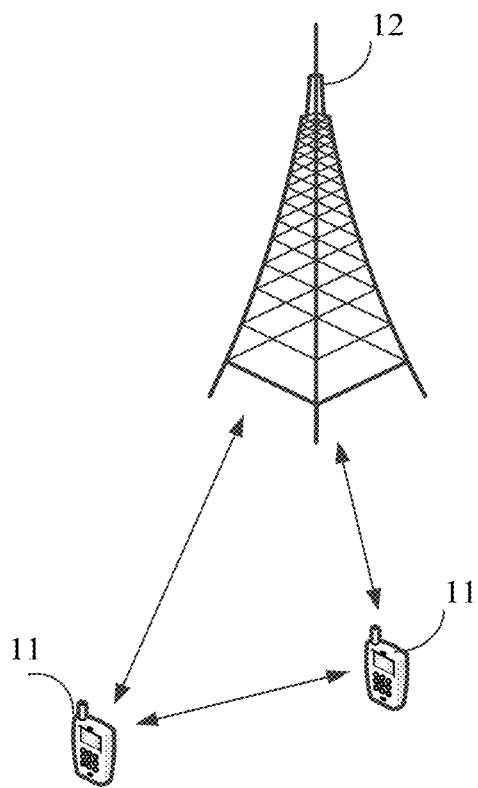
FIG. 1 is a block diagram of a wireless communications system to which an embodiment of this application is applicable.

FIG. 1 is a block diagram of a wireless communications system to which an embodiment of this application is applicable. The wireless communications system includes a terminal 11 and a network-side device 12. The terminal 11 may also be referred to as a terminal device or user equipment (UE). The terminal 11 may be a terminal side device such as a mobile phone, a tablet personal computer, a laptop computer or notebook computer, a personal digital assistant (PDA), a palmtop computer, a netbook, an ultra-mobile personal computer (UMPC), a mobile internet device (MID), a wearable device, vehicle user equipment (VUE), or pedestrian user equipment (PUE). The wearable device includes a wrist band, earphones, glasses, or the like. It should be noted that a specific type of the terminal 11 is not limited in the embodiments of this application. The network-side device 12 may be a base station or a core network-side device. The base station may be referred to as a NodeB, an evolved NodeB, an access point, a base transceiver station (BTS), a radio base station, a radio transceiver, a basic service set (BSS), an extended service set (ESS), a Node B, an evolved Node B (eNB), a home Node B, a home evolved Node B, a WLAN access point, a Wi-Fi node, a transmission/reception point (Transmitting Receiving Point, TRP), or another appropriate term in the art. Provided that the same technical effects are achieved, the base station is not limited to a specified technical term. It should be noted that in the embodiments of this application, the base station in the NR system is merely used as an example, but does not limit a specific type of the base station.

For a multi-antenna system, a transmit end may optimize signal transmission based on channel state information (CSI), so that the signal transmission better matches a state of a channel. For example, a channel quality indicator (CQI) may be used to select an appropriate modulation and coding scheme (MCS) to achieve link adaptation; and a precoding matrix indicator (PMI) may be used to achieve eigen beamforming to maximize strength of a received signal or to suppress interference (such as inter-cell interference or multi-user interference). Therefore, CSI acquisition has been a focus of research since multi-antenna technology (multi-input multi-output, MIMO) was proposed.

Typically, CSI is acquired mainly in two manners: explicit feedback, such as feedback of a CQI or PMI; and implicit feedback, such as using channel reciprocity. For a massive antenna array system (massive MIMO), resource overheads of the explicit feedback are large due to the large number of antennas, and therefore the implicit feedback based on channel reciprocity is favored.

In a typical case of acquiring CSI based on channel reciprocity, a terminal sends a sounding reference signal (SRS) to a network, and then the network performs channel estimation based on the SRS to obtain uplink channel information; then, the network converts the uplink channel information into downlink channel information based on the channel reciprocity, and determines a precoding matrix for downlink data transmission accordingly.

Generally, the channel reciprocity exists in a time division duplex (TDD) system. For example, in angular domain, an angle of departure (AoD) of a downlink channel is equal to an angle of arrival (AoA) of an uplink channel; and in delay domain, uplink and downlink channels have the same channel impulse response (CIR).

However, during actual measurement, it is found that in a frequency division duplex (FDD) system, uplink and downlink channels also have a certain degree of reciprocity: In angular domain, an AoD of the downlink channel is equal to an AoA of the uplink channel; and in delay domain, the uplink and downlink channels have the same power delay profile (PDP), that is, the uplink and downlink channels have the same multipath delay and multipath power. However, the paths vary in phase. To distinguish from the full channel reciprocity (full reciprocity) in the TDD system, such degree of reciprocity in the FDD system is referred to as partial channel reciprocity (partial reciprocity).

A transmission method and apparatus, a device, and a readable storage medium provided in the embodiments of this application are described below in detail by using some embodiments and their application scenarios with reference to the accompanying drawings.

Figure 2:
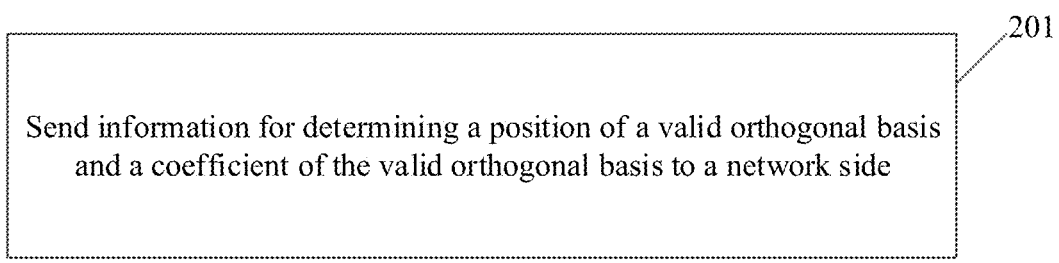
FIG. 2 is a first flowchart of a transmission method according to an embodiment of this application.

Referring to FIG. 2, an embodiment of this application provides a transmission method performed by a terminal. Specifically, step 201 is included.

Step 201: Send information for determining a position of a valid orthogonal basis and a coefficient of the valid orthogonal basis to a network side.

Optionally, the orthogonal basis may include one or more of a frequency domain orthogonal basis, a spatial domain orthogonal basis, and a joint spatial-frequency orthogonal basis.

Optionally, the information for determining the position of the valid orthogonal basis includes one or more of first information, second information, and third information.

The first information includes a maximum valid port index and/or a maximum valid joint spatial-frequency orthogonal basis index.

The second information is used to indicate one or more target information pairs selected from a first information pair set, where the first information pair set includes a plurality of information pairs including the first information and the third information. The third information includes a result selected by the terminal from frequency domain orthogonal basis related information that is indicated by the network side or agreed upon in a protocol.

The first information, the second information, and the third information are used for the network side to reconstruct downlink precoding (for example, physical downlink shared channel (PDSCH) precoding), so that the network side can adjust a correspondence between orthogonal bases and ports based on a maximum port index reported by the terminal and a finally determined valid orthogonal basis, to reduce feedback overheads of the terminal.

The terminal may or may not send the first information, the second information, or the third information. For example, if the terminal does not send the third information, the network side may not have this information; if the terminal does not send the first information, the network side has default information, for example, an identity matrix; if the terminal does not send the second information, the network side selects all the target information pairs by default; and if the terminal does not send the third information, the network side does not have this information by default.

In an embodiment of this application, the method further includes: receiving first indication information, where the first indication information indicates that the terminal is to send one or more of the first information, the second information, and the third information.

In other words, the network side may indicate that the terminal is to or not to send the first information, the second information, and the third information.

It can be understood that the first information or the third information may be delay related information. The network side may calculate delay information (for example, frequency domain orthogonal basis related information) of a downlink channel from an uplink channel based on delay reciprocity, and then the network side notifies the determined delay information to the terminal. The terminal selects and reports the first information and/or the third information within a range notified by the network side. This differs from the existing solution in that the terminal performs selection not from the entire range, but from delay position information, namely, the frequency domain orthogonal basis, indicated by the network side. A basis for the indication by the network side is the delay reciprocity.

In an embodiment of this application, the method further includes: sending the coefficient of the valid orthogonal basis to the network side.

It can be understood that as used herein, the spatial domain orthogonal basis is equivalent to beam information, the frequency domain orthogonal basis is equivalent to delay information, and the joint spatial-frequency orthogonal basis is equivalent to information obtained by performing calculation jointly based on the beam information and the delay information, or is equivalent to information obtained by performing calculation separately based on the beam information and the delay information and then combining the results.

In an embodiment of this application, the frequency domain orthogonal basis related information is indicated by the network side or agreed upon in the protocol.

In an embodiment of this application, the frequency domain orthogonal basis related information includes one or more of the following:
(1) a frequency domain resource position;
(2) a time domain delay position;
(3) a delay position difference;
(4) a corresponding discrete Fourier transform (DFT) vector; and
(5) a difference between the time domain delay position and a reference position;
where the reference position is a delay position of an orthogonal basis carried by a channel state information reference signal (CSI-RS).

Optionally, there may be a plurality of reference positions, and a delay difference corresponding to each reference position may be common or specific.

In an embodiment of this application, the information pair in the first information pair set includes one piece of the third information and a spatial domain orthogonal basis carried on a CSI-RS port corresponding to one CSI-RS port index;
or
the information pair in the first information pair set includes one piece of the third information and a joint spatial-frequency orthogonal basis carried on a CSI-RS port corresponding to one CSI-RS port index.

In an embodiment of this application, the CSI-RS port index is less than a maximum valid CSI-RS port index indicated by the first information. In other words, CSI-RS port indexes for all information pairs included in the first information pair set are all port indexes preceding the maximum valid CSI-RS port index indicated by the first information.

In an embodiment of this application, the information pair in the first information pair set includes one joint spatial-frequency orthogonal basis index.

In an embodiment of this application, the joint spatial-frequency orthogonal basis index is less than a joint spatial-frequency orthogonal basis index indicated by the first information. In other words, joint spatial-frequency orthogonal basis indexes for all information pairs included in the first information pair set are all joint spatial-frequency orthogonal basis indexes preceding the joint spatial-frequency orthogonal basis index indicated by the first information.

In an embodiment of this application, a set consisting of the one or more target information pairs is a subset of the first information pair set.

In an embodiment of this application, the second information includes: a bitmap, where an indication bit in the bitmap is used to indicate an information pair including the first information and the third information; or an index of an information pair including the first information and the third information.

In an embodiment of this application, if the first information includes the maximum valid port index, the third information corresponding to different valid ports is the same or different.

In this embodiment of this application, the terminal sends the information for determining the position of the valid orthogonal basis and the coefficient of the valid orthogonal basis to the network side, so that the network side can optimize the design of precoding for downlink transmission, thereby increasing channel capacity. Further, the network side may obtain the delay information (for example, the frequency domain orthogonal basis related information) based on the delay reciprocity, and the network side notifies, based on the obtained delay information, the terminal to report accurate delay information (for example, the first information and/or the third information) within a specified position or range. That means the terminal can select, based on the indication of the network side, content to be reported, thereby reducing the amount of reporting by the terminal, or improving network performance with the same amount of reporting by the terminal.

Figure 3:
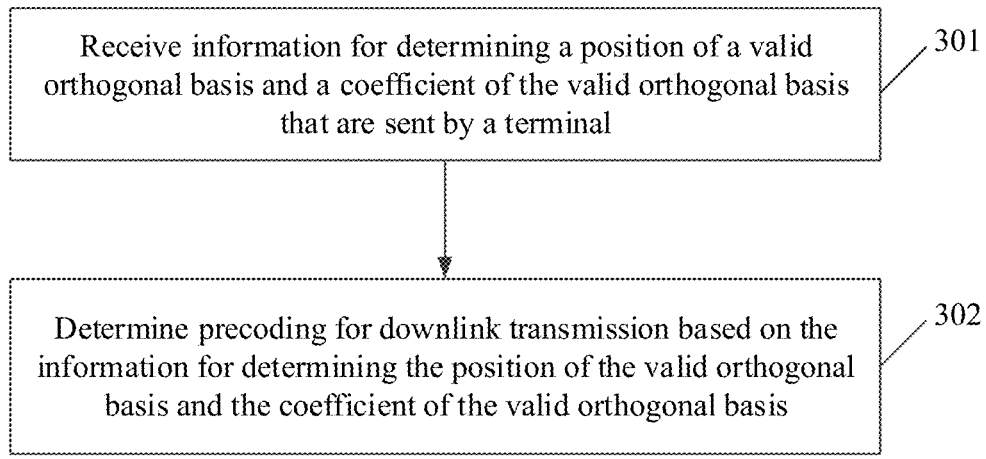
FIG. 3 is a second flowchart of a transmission method according to an embodiment of this application.

Referring to FIG. 3, an embodiment of this application provides a transmission method, which is performed by a network-side device. Specifically, step 301 and step 302 are included.

Step 301: Receive information for determining a position of a valid orthogonal basis and a coefficient of the valid orthogonal basis that are sent by a terminal.

For example, the orthogonal basis may include one or more of a frequency domain orthogonal basis, a spatial domain orthogonal basis, and a joint spatial-frequency orthogonal basis.

Step 302: Determine precoding for downlink transmission (for example, PDSCH precoding) based on the information for determining the position of the valid orthogonal basis and the coefficient of the valid orthogonal basis.

Optionally, the information for determining the position of the valid orthogonal basis includes one or more of first information, second information, and third information.

The first information includes a maximum valid port index and/or a maximum valid joint spatial-frequency orthogonal basis index.

The second information is used to indicate one or more target information pairs selected from a first information pair set, where the first information pair set includes a plurality of information pairs including the first information and the third information; and the third information includes a result selected by the terminal from frequency domain orthogonal basis related information that is indicated by the network side or agreed upon in a protocol.

In an embodiment of this application, the method further includes: sending first indication information, where the first indication information indicates the terminal to send one or more of the first information, the second information, and the third information.

In an embodiment of this application, the method further includes: sending, by the network-side device, second indication information, where the second indication information indicates the frequency domain orthogonal basis related information.

In an embodiment of this application, the determining, by the network-side device, precoding for downlink transmission based on the information for determining the position of the valid orthogonal basis and the coefficient of the valid orthogonal basis includes:
  determining a valid joint spatial-frequency orthogonal basis based on the first information and the second information; and
  determining the precoding for downlink transmission based on the valid joint spatial-frequency orthogonal basis and the coefficient of the valid orthogonal basis.

In an embodiment of this application, the determining, by the network-side device, precoding for downlink transmission based on the information for determining the position of the valid orthogonal basis and the coefficient of the valid orthogonal basis includes:
  determining a valid spatial domain orthogonal basis and a valid frequency domain orthogonal basis based on the first information, the second information, and the third information; and determining the precoding for downlink transmission based on the coefficient of the valid orthogonal basis, the valid spatial domain orthogonal basis, and the valid frequency domain orthogonal basis.

In an embodiment of this application, the method further includes: sending second indication information, where the second indication information is used to indicate the frequency domain orthogonal basis related information.

In an embodiment of this application, the frequency domain orthogonal basis related information includes one or more of the following:
  (1) a frequency domain resource position;
  (2) a time domain delay position;
  (3) a delay position difference;
  (4) a corresponding DFT vector; and
  (5) a difference between the time domain delay position and a reference position;
  where the reference position is a delay position of an orthogonal basis carried by a CSI-RS.

Optionally, there may be a plurality of reference positions, and a delay difference corresponding to each reference position may be common or specific.

In an embodiment of this application, the information pair in the first information pair set includes one piece of the third information and a spatial domain orthogonal basis carried on a CSI-RS port corresponding to one CSI-RS port index; or the information pair in the first information pair set includes one piece of the third information and a joint spatial-frequency orthogonal basis carried on a CSI-RS port corresponding to one CSI-RS port index.

In an embodiment of this application, the CSI-RS port index is less than a maximum valid CSI-RS port index indicated by the first information.

In an embodiment of this application, the information pair in the first information pair set includes one joint spatial-frequency orthogonal basis index.

In an embodiment of this application, the joint spatial-frequency orthogonal basis index is less than a joint spatial-frequency orthogonal basis index indicated by the first information.

In an embodiment of this application, a set consisting of the one or more target information pairs is a subset of the first information pair set.

In an embodiment of this application, the second information includes: a bitmap, where an indication bit in the bitmap indicates an information pair including the first information and the third information; or an index of an information pair including the first information and the third information.

In an embodiment of this application, the method further includes: determining an orthogonal basis corresponding to a CSI-RS port; encoding a CSI-RS through the orthogonal basis to obtain a first CSI-RS; and sending the first CSI-RS via the CSI-RS port.

For example, mapping of CSI-RS port 0 to orthogonal basis 0 and CSI-RS port 1 to orthogonal basis 1 is adjusted to mapping of CSI-RS port 0 to orthogonal basis 1 and CSI-RS port 1 to orthogonal basis 0.

In an embodiment of this application, if the first information includes the maximum valid port index, the third information corresponding to different valid ports is the same or different.

In this embodiment of this application, the network side receives the information for determining the position of the valid orthogonal basis and the coefficient of the valid orthogonal basis from the terminal, so that the network side can optimize the design of precoding for downlink transmission, thereby increasing channel capacity. Further, the network side may obtain the delay information (for example, the frequency domain orthogonal basis related information) based on the delay reciprocity, and the network side notifies, based on the obtained delay information, the terminal to report delay information (for example, the first information and/or the third information) within a specified position or range. That means the terminal selects, based on the indication of the network side, content to be reported, thereby reducing the amount of reporting by the terminal, or improving network performance with the same amount of reporting by the terminal.

The embodiments of this application are described below with reference to the following implementations.

Implementation 1 of the Present Application:

First, the network side uses signaling to trigger the terminal to send a sounding reference signal (SRS). Correspondingly, the network side obtains an impulse response of an uplink channel based on the SRS sent by the terminal. The SRS sent by the terminal may be precoded or not precoded.

The network side estimates corresponding beam information (namely, a spatial domain orthogonal basis (Spatial Domain basis, SD basis)) based on the received SRS, and then generates a CSI-RS precoder based on the spatial domain orthogonal basis.

First, spatial domain orthogonal bases are sorted and mapped to CSI-RS port 0 to port N in descending order, where N is the total number of CSI-RS ports used. Then, the precoded CSI-RS is sent to the terminal.

Specifically, assuming that a channel of each SRS received by the network side is $H_i$, the network side calculates the second moment of the channel $COV=\Sigma_1^{N_{SRS}}(H_i^* H_i^H)$ where i=1, 2 ... $N_{SRS}$, and $N_{SRS}$ represents the number of SRSs.

If the network side uses a singular value decomposition (SVD) method, the network side performs eigen value decomposition (EVD) on the second moment of the channel to obtain eigenvalues $[\theta_1 \theta_2 \ldots \theta_{N_t}]$ and eigenvectors $[\alpha_1 \alpha_2 \ldots \alpha_{N_t}]$, where $N_t$ is the number of transceiver units (TXRU) of the network side, and each eigenvector is a spatial domain orthogonal basis. The network side sorts the corresponding spatial domain orthogonal bases in descending order based on the eigenvalues that are sorted in descending order.

If the network side uses an oversampling discrete Fourier transform (DFT) method, oversampled DFT vectors $[d_1 d_2 \ldots d_{N_t}]$ are calculated based on the number of TXRUs at the transmit end and an oversampling ratio, where each DFT vector is a candidate spatial domain orthogonal basis, and a metric $m_i=d_i^H*cov*d_i$ corresponding to each DFT vector is calculated separately to obtain $[m_1 m_2 \ldots m_{N_t}]$. The network side sorts the corresponding spatial domain orthogonal bases in descending order based on the metrics that are sorted in descending order.

The network side maps, based on the configured number $N_P$ of CSI-RS ports, the first $N_P$ spatial domain orthogonal bases to CSI-RS port 0 to port N, respectively, as a corresponding CSI-RS precoder.

The network side estimates, based on the received SRS, corresponding delay information (namely, a frequency domain orthogonal basis (Frequency Domain basis, FD basis)), and selects and indicates an appropriate frequency domain orthogonal basis to the terminal.

Specifically, it is assumed that the network side may indicate a set of target paths (frequency domain orthogonal bases) independently for each spatial domain orthogonal basis, or may indicate a set of common target paths (frequency domain orthogonal bases) that are applicable to all the spatial domain orthogonal bases. First, the network side calculates strength of each time domain path and selects a position of the target path based on the strength of the time domain path, where the target path satisfies at least one of the following conditions:

(1) Several paths with the highest strength. The number of paths is specified in the protocol or configured via signaling.

(2) Several paths with a strength greater than a threshold. The threshold is specified in the protocol or configured via signaling.

(3) Several paths at a position of maximum, where the number of paths is specified in the protocol or configured via signaling, and the position of maximum is defined as a position at which a path has a strength greater than that of a previous path and a next path.

Figure 4:
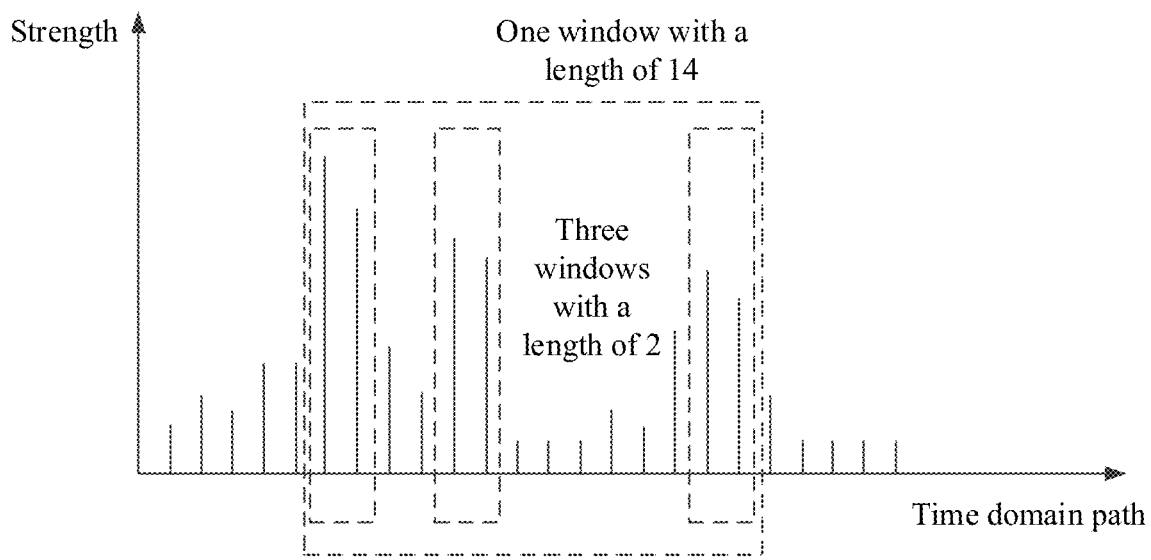
FIG. 4 is a schematic diagram of indicating a target path according to an embodiment of this application.

(4) The network side indicates the position of the target path to the terminal via signaling, where a method for indicating includes but is not limited to:

directly indicating an index of each path;

indicating an index of the largest path and index differences between other paths and the largest path; or including all the target paths in several windows, the length and number of which may be agreed upon in the protocol or configured by a base station, where all the windows do not overlap each other, and the union of all the windows includes all the target paths, and may additionally include some other paths, as shown in FIG. 4. The network side indicates a starting position of the window.

The signaling may be at least one of the following signaling:

(1) radio resource control (RRC) signaling;

(2) media access control (MAC) control element (CE); or (3) downlink control information (DCI).

The terminal estimates the CSI-RS at the CSI-RS resource position configured by the network, obtains an impulse response of a downlink channel, receives path information indicated by the network side, and calculates, based on such information, content to be reported.

Figure 5:
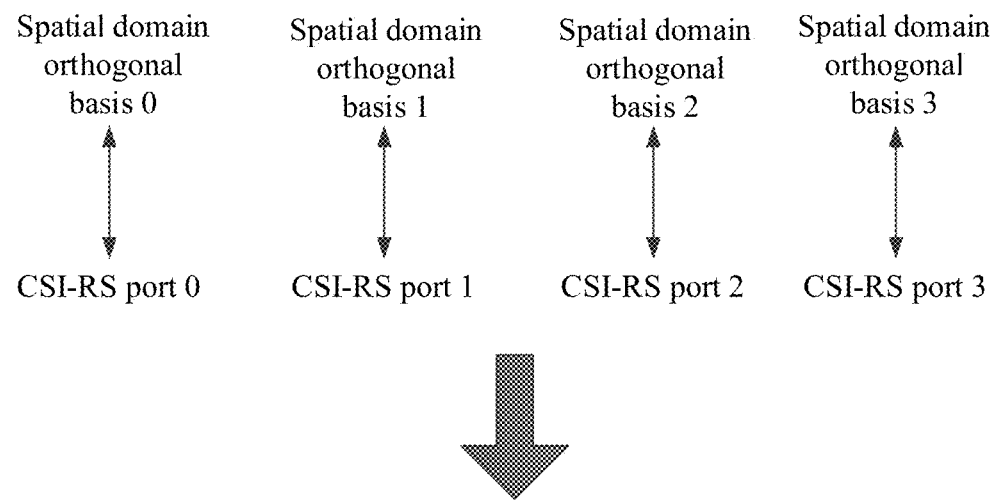
FIG. 5 is a schematic diagram of a correspondence between paths and port indexes according to an embodiment of this application.

Specifically, the terminal calculates a precoder on each precoding matrix indicator (PMI) subband. The PMI subband is a granularity of PMI reporting, that is, $N_{PMI\text{-}subband}=R*N_{CQI\text{-}subband}$, where R is a protocol configuration parameter, $N_{PMI\text{-}subband}$ represents the number of subbands for calculating and reporting PMIs, and $N_{CQI\text{-}subband}$ represents the number of subbands for calculating and reporting CQIs. Then, a time domain precoding matrix subjected to inverse discrete Fourier transform (IDFT) is calculated based on positions of $N_{path}$ delay paths indicated by the network side, so as to obtain $N_p*N_{path}$ coefficients, where $N_p$ represents the number of CSI-RS ports. Finally, based on the number $N_c$ of reported coefficients configured by the network side, $N_c$ coefficients with the largest amplitudes and the absolute amplitudes greater than a fixed threshold are selected as finally reported coefficients. The corresponding CSI-RS ports are found based on the $N_c$ coefficients, and the maximum CSI-RS port index $N'_p$ and the positions of all corresponding paths are reported, as shown in FIG. 5.

The terminal reports the maximum port index, namely, port 2, and the selected delay positions, namely, paths 0, 2, 3, and 4, as well as a 3×4 bitmap, or a combinatorial number indicating which 5 of the 12 coefficients are selected.

Optionally, the terminal may alternatively directly report a position of a path selected for each of the port indexes.

Optionally, the terminal may first perform CSI-RS port selection and/or path selection, then perform coefficient calculation at positions of the selected port and path, and finally report them in the same manner as described above.

The reporting channel may be at least one of a physical uplink control channel (PUCCH) and a physical uplink shared channel (PUSCH). The reporting may be at least one of periodic reporting, aperiodic reporting, and semi-persistent reporting.

The network side receives a reporting result from the terminal, determines valid orthogonal bases $[\sigma_1, \sigma_2 \ldots \sigma_{P_{max}}]$ by using orthogonal bases based on the maximum port index $P_{max}$ and the CSI-RS precoder reported by the terminal, and calculates a projection result of each orthogonal basis on each PMI subband based on the positions of the time domain paths and corresponding coefficients reported by the terminal. A projection of $\sigma_i$ on the $n^{th}$ PMI subband is $$\sigma_{i,n} = \sigma_i * \sum_{k=1}^{N_{PMI-subband}-1} \beta_k * e^{j2\pi \frac{k*n}{N_{PMI-subband}}},$$

where $\beta_k$ is a coefficient of each time domain tap; if the terminal has reported a coefficient, $\beta_k$ is the result reported by the terminal, otherwise, $\beta_k=0$; and j is an imaginary unit, and k is a cyclic symbol of summation, indicating the $k^{th}$ subcarrier. Finally, the orthogonal bases on each PMI subband are summed to obtain a PDSCH precoder on the PMI subband, that is, $W_n = \sum_{i=1}^{P_{max}} \sigma_{i,n}$.

Figure 6:
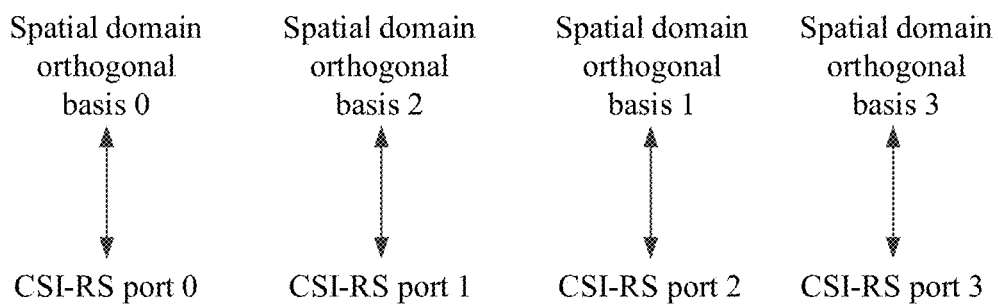
FIG. 6 is a schematic diagram of a correspondence between orthogonal bases and CSI-RS ports according to an embodiment of this application.

Optionally, the network side adjusts a correspondence between orthogonal bases and CSI-RS ports based on the maximum CSI-RS port index reported by the terminal and the finally determined valid orthogonal bases, and maps L valid orthogonal bases to the first L CSI-RS ports in sequence. As shown in FIG. 6, spatial domain orthogonal basis 0 and spatial domain orthogonal basis 2 corresponding to CSI-RS port 0 and CSI-RS port 2 are valid orthogonal bases, and then at the next time, spatial domain orthogonal basis 0 may be adjusted to correspond to port 0, and spatial domain orthogonal basis 2 may be adjusted to correspond to port 1, so as to reduce feedback overheads of the terminal.

Implementation 2 of the Present Application:

First, the network side uses signaling to trigger the terminal to send an SRS. Correspondingly, the network side obtains an impulse response of an uplink channel based on the SRS sent by the terminal. The SRS sent by the terminal may be precoded or not precoded.

The network side estimates corresponding beam information and delay information (namely, a spatial domain orthogonal basis and a frequency domain orthogonal basis) based on the received SRS, and then calculates a joint spatial-frequency orthogonal basis as a CSI-RS precoder based on the spatial domain orthogonal basis and frequency domain orthogonal basis. A calculation method of the joint spatial-frequency orthogonal basis may be SVD, oversampling DFT, or the like, or may be joint calculation in spatial domain and frequency domain, or may be separate calculation in spatial domain and frequency domain and then combination of the results.

After obtaining Q joint spatial-frequency orthogonal bases through calculation, the network side first sorts the Q joint spatial-frequency orthogonal bases. The sorting may be random or fixed, for example, depending on the implementation of the network side. For example, if the joint spatial-frequency orthogonal bases are calculated according to the SVD method, the orthogonal bases may be sorted according to eigenvalues corresponding to the joint spatial-frequency orthogonal bases. A set of orthogonal bases $[\alpha_1, \alpha_2 \ldots \alpha_Q]$ is obtained after the sorting, where the eigenvalues of the orthogonal bases are in descending order.

The network side needs to map the Q joint spatial-frequency orthogonal bases to P CSI-RS ports. If P=Q, that is, one orthogonal basis is mapped to each port, the strongest joint spatial-frequency orthogonal basis $\alpha_1$ is mapped to port 0, the second strongest joint spatial-frequency orthogonal basis $\alpha_2$ is mapped to port 1, and so on. If P<Q, that is, a plurality of joint spatial-frequency orthogonal bases are mapped to each port, for example, a joint spatial-frequency orthogonal basis $\alpha_1$ may be mapped to the first position of port 0, a joint spatial-frequency orthogonal basis $\alpha_2$ may be mapped to the first position of port 1, and so on; after mapping to the first positions of all the ports is complete, mapping to the second positions starts, as shown in FIG. 7.

The network side maps the joint spatial-frequency orthogonal bases to different CSI-RS ports in sequence, and transmits the CSI-RS ports. If P<Q, it is required to configure mapping information of the orthogonal bases on each port.

The terminal estimates the CSI-RS at the CSI-RS resource position configured by the network side, obtains an impulse response of a downlink channel, receives the mapping information configured by the network side, and calculates, based on such information, content to be reported.

The terminal calculates a coefficient of each orthogonal basis; selects, based on the configured number of reported coefficients or other constraints, several valid orthogonal bases with coefficients to be reported; based on CSI-RS ports on which these orthogonal bases are located, reports the maximum CSI-RS port index; and reports all positions containing the valid orthogonal bases and distribution of the valid orthogonal bases within a range of all orthogonal bases determined by these two parameters, where the distribution may be a bitmap, a combinatorial number, or the like. Details are shown in FIG. 8.

The terminal reports the maximum port index 2, positions [0, 1, 2], and a 3*3 bitmap indicating which orthogonal bases have valid coefficients.

The coefficients of the valid orthogonal bases are the first M coefficients that have an amplitude greater than a threshold and that are sorted in descending order, where M is configured by the network side.

Optionally, the terminal may first select a port or an orthogonal basis, then perform coefficient calculation for the selected orthogonal basis, and report a selected maximum port index, or a maximum port index corresponding to the selected orthogonal basis.

Optionally, the terminal may directly report position information corresponding to each port.

After receiving the maximum port index and position reported by the terminal, the network side determines ports with the presence of valid orthogonal bases based on the maximum port index, may determine positions with the presence of the valid orthogonal bases based on the position information, may determine final valid orthogonal bases $[\sigma_1, \sigma_2 \ldots \sigma_{Q_{max}}]$ based on the bitmap or the like reported by the terminal, and may calculate a precoder $W = \sum_{i=1}^{Q_{max}} r_i \sigma_i$ based on coefficients $[r_1, r_2 \ldots r_{Q_{max}}]$ of all the valid orthogonal bases reported by the terminal. W is a result obtained by joint calculation with respect to all the PMI subbands, and a final PDSCH precoder for each PMI subband may be obtained by separate calculation with respect to each PMI subband.

Figures 9, 10:
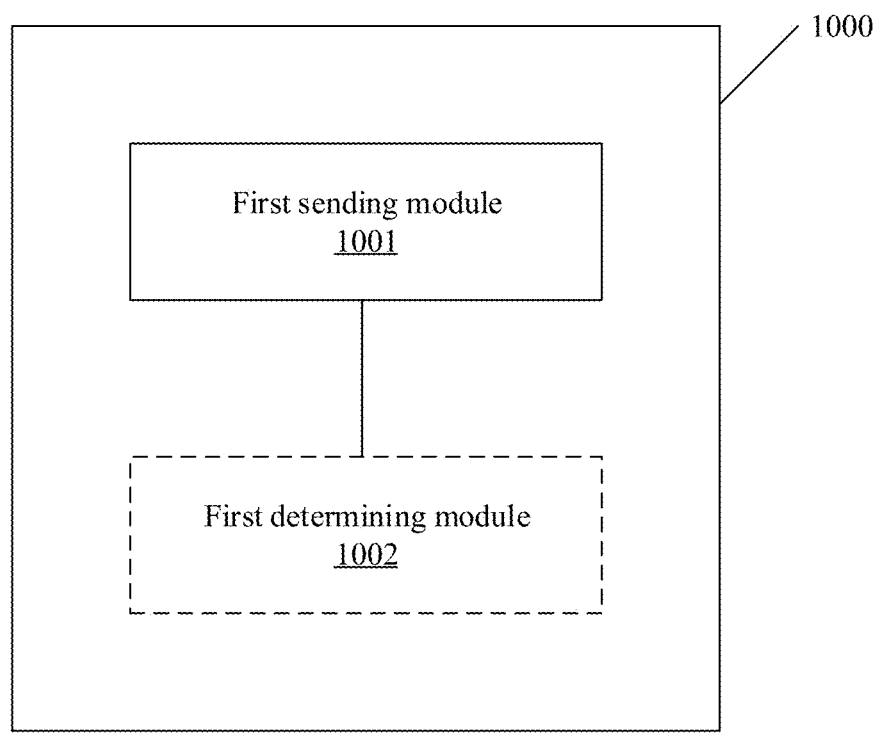
FIG. 9 is a third schematic diagram of a correspondence between each position of a port and an orthogonal basis according to an embodiment of this application.
FIG. 10 is a first schematic diagram of a transmission apparatus according to an embodiment of this application.

Optionally, the network side may adjust a mapping relationship between orthogonal bases and ports based on the maximum port index reported by the terminal and the finally determined valid orthogonal bases. If P=Q, that is, one orthogonal basis is mapped to one port, the valid orthogonal bases may be mapped to the first $Q_{max}$ ports in sequence. If P<Q, that is, a plurality of orthogonal bases are mapped to one port, the valid orthogonal bases may be mapped preferentially, as shown in FIG. 9.

An example for a single rank is described above. An implementation procedure for a plurality of ranks is the same as that for a single rank. For each rank, the terminal may report the maximum port index, position, corresponding bitmap, and the like; or may report a common maximum port index and position for all layers, and then report the respective bitmap for each layer.

Implementation 3 of the Present Application:

As in implementation 2, the network side obtains channel information via an SRS and maps joint spatial-frequency orthogonal bases to CSI-RS ports in sequence for CSI-RS precoding.

The terminal receives a CSI-RS from the network side, detects an impulse response of a downlink channel, calculates a coefficient of each basis, and selects $Q_{max}$ valid coefficients and corresponding valid joint spatial-frequency orthogonal bases. The terminal may directly report a maximum valid orthogonal basis index, where the index corresponds to the CSI-RS port and/or a mapped-to position on the port.

For example, the network side indicates 16 orthogonal bases, where the 16 orthogonal bases may be on 16 CSI-RS ports; or may be on 4 CSI-RS ports, each having 4 different orthogonal bases. The terminal selects orthogonal bases numbered [0, 1, 2, 3, 7, 8] as valid orthogonal bases according to a sequence that is agreed upon in a protocol or configured by the network, and then the terminal reports the maximum valid index 8, as well as a bitmap with a length of 9, a combinatorial number, or the like indicating which orthogonal bases are the valid orthogonal bases.

After receiving the maximum valid index 8 reported by the terminal, the network side considers the nine orthogonal bases numbered from 0 to 8 as a range of valid orthogonal bases, then determines the specific valid orthogonal bases based on the information such as the bitmap reported by the terminal, and restores PDSCH precoding based on the coefficients of the corresponding reported orthogonal bases.

Optionally, the network side may update a correspondence between joint spatial-frequency orthogonal bases and CSI-RS ports based on the maximum orthogonal basis index reported by the terminal. To be specific, the current valid orthogonal bases are adjusted to the first several CSI-RS ports or to the first several joint spatial-frequency orthogonal basis indexes.

An example for a single rank is described above. An implementation procedure for a plurality of ranks is the same as that for a single rank. For each rank, the terminal may report the maximum valid orthogonal basis index, corresponding bitmap or the like; or may report a common maximum valid orthogonal basis index for all layers, and then report the respective bitmap for each layer.

Implementation 4 of the Present Application:

After calculating coefficients of target paths, the terminal side may first select several strongest target paths, and then report coefficients of all the target paths.

If the terminal has received a total of P CSI-RS ports, positions of N target paths that are indicated by a base station are $t_1, t_2, \ldots, t_N$, and the terminal has calculated a coefficient $c_{p,n}$ of each CSI-RS port on each target path, the terminal first calculates a total coefficient $$c_n = \sum_{1}^{P} |c_{p,n}|^2$$

of each target path on all the ports, and selects the K largest target paths, where K may be agreed upon in the protocol or calculated based on a threshold which may be agreed upon in the protocol. According to the selected K target paths and P ports, a total of K×P coefficients need to be reported. The terminal side needs to report the number of ports selected, which paths of which window or windows are selected, and a bitmap composed of these ports and paths, namely, a K×P bitmap.

Alternatively, the terminal side may directly select several strongest coefficients, that is, directly select coefficients with the largest amplitudes among N×P coefficients. In this case, positions of the reported coefficients need to be marked among the N×P coefficients, that is, the number of ports selected and an N×P bitmap need to be reported.

Implementation 5 of the Present Application:

The network side encodes beam information obtained based on SRSs and maps the beam information to CSI-RS ports in descending order of strength. To be specific, port 0 corresponds to the strongest beam, and port 1 corresponds to the second strongest beam.

After receiving a CSI-RS and obtains an impulse response of a downlink channel, the terminal side calculates a strength for each port, and selects a port that satisfies a threshold condition as a port selection result based on the strength for each port, where the threshold condition may be as follows:
 (1) A sum of second moments of all coefficients is greater than a threshold.
 (2) A ratio of the sum of the second moments of all the coefficients to a maximum value thereof is greater than a ratio threshold.

Both the threshold and the ratio threshold may be agreed upon in the protocol or configured via RRC.

The terminal reports the number of ports selected to the network side, and uses the ports selected for subsequent calculation.

The network side selects port 0 to port M−1 as basis vectors for PDSCH precoder reconstruction based on the number M of ports reported by the terminal.

Implementation 6 of the Present Application:

The network side estimates beam and delay information, namely a spatial domain orthogonal basis and a frequency domain orthogonal basis, based on a received uplink SRS. The network side combines each spatial domain orthogonal basis and some of frequency domain orthogonal bases corresponding to the spatial domain orthogonal bases into joint spatial-frequency orthogonal bases. For example, the network side estimates $SD_1$ $SD_2$ ... $SD_N$, where each $SD_i$ corresponds to $N_i$ frequency domain orthogonal bases. The frequency domain orthogonal bases corresponding to each spatial domain orthogonal basis and the number thereof may be the same or different, depending on a range to be indicated by the network side.

The network side selects K frequency domain orthogonal bases for each $SD_i$. For example, if K=2, the network side selects two appropriate frequency domain orthogonal bases, namely $FD_{i1}$ and $FD_{i2}$, and obtains joint spatial-frequency orthogonal bases, namely SD-FD$_{i1}$ and SD-FD$_{i2}$, by calculating Kronecker products of the spatial domain orthogonal basis and the frequency-domain orthogonal bases.

The network side encodes the K joint spatial-frequency orthogonal bases to CSI-RSs and transfers them to the terminal, where the K joint spatial-frequency orthogonal bases may occupy K CSI-RS ports, with one orthogonal basis for each port; or may occupy L CSI-RS ports, with K/L orthogonal bases for each port.

In addition, the network side indicates, to the UE, relationships between the other frequency domain orthogonal bases and the selected K frequency domain orthogonal bases, namely, delay differences. Because the K frequency domain orthogonal bases are already present in the CSI-RSs, each difference can represent the K different frequency domain orthogonal bases. Such indication may be a DCI, MAC CE, or RRC signaling indication, or may be a fixed indication that is agreed upon in the protocol.

After receiving the CSI-RSs, the terminal side obtains, based on a result of channel estimation, a joint spatial-frequency orthogonal basis encoded in the CSI-RS, and then obtains all candidate joint spatial-frequency orthogonal bases based on the relationships, indicated by the network side, between the other frequency domain orthogonal bases and the existing frequency domain orthogonal bases. The terminal side then selects an appropriate joint spatial-frequency orthogonal basis from these candidate joint spatial-frequency orthogonal bases, and reports a CSI-RS port corresponding to the selected joint spatial-frequency orthogonal basis and content selected from the frequency domain orthogonal basis information indicated by the network side, or reports the joint spatial-frequency orthogonal basis carried in the CSI-RS and the content selected from the frequency domain orthogonal basis information indicated by the network side. For example, the network side performs joint coding on the frequency domain orthogonal bases and spatial domain orthogonal bases with delay=0 and delay=9, transfers the joint spatial-frequency orthogonal bases, which are respectively mapped to CSI-RS ports 0 and 1, to the terminal side via CSI-RSs, and indicates that delay differences of the frequency domain orthogonal bases are 1 and 2. In this case, the terminal side obtains, based on the CSI-RSs, joint spatial-frequency orthogonal bases with delays=0 and 9 corresponding to each spatial domain orthogonal basis, and calculates the corresponding joint spatial-frequency orthogonal bases with the delay of 1, 2, 10, and 11. If the terminal side selects the joint spatial-frequency orthogonal bases with the delay of 1 and 11, the terminal reports the selected CSI-RS ports 0 and 1 and the delays 1 and 2. In addition, the terminal reports a corresponding bitmap or combinatorial number indicating a position of a non-zero coefficient, and a phase and an amplitude of the non-zero coefficient.

The network side restores, based on the information reported by the terminal, the range of the joint spatial-frequency orthogonal bases selected by the terminal, that is, the joint spatial-frequency orthogonal bases with the delay of 1, 2, 10, and 11. The network side obtains, based on the bitmap [1001] reported by the terminal side, the joint spatial-frequency orthogonal bases selected by the terminal side, that is, the joint spatial-frequency orthogonal bases with the delay of 1 and 11, so as to finally obtain the PDSCH precoder based on the corresponding phase and amplitude.

Referring to FIG. 10, an embodiment of this application provides a transmission apparatus. The apparatus 1000 includes:

a first sending module 1001, configured to send information for determining a position of a valid orthogonal basis and a coefficient of the valid orthogonal basis to a network side.

Optionally, the apparatus 1000 further includes: a first determining module 1002, configured to determine information about a position of a valid orthogonal basis and a coefficient of the valid orthogonal basis.

In an embodiment of this application, the information for determining the position of the valid orthogonal basis includes one or more of first information, second information, and third information.

The first information includes a maximum valid port index and/or a maximum valid joint spatial-frequency orthogonal basis index.

The second information is used to indicate one or more target information pairs selected from a first information pair set, where the first information pair set includes a plurality of information pairs including the first information and the third information. The third information includes a result selected by the terminal from frequency domain orthogonal basis related information that is indicated by the network side or agreed upon in a protocol.

In an embodiment of this application, the apparatus 1000 further includes:

a first receiving module, configured to receive first indication information, where the first indication information indicates the terminal to send one or more of the first information, the second information, and the third information.

In an embodiment of this application, the frequency domain orthogonal basis related information includes one or more of a frequency domain resource position, a time domain delay position, a delay position difference, a corresponding DFT vector, and a difference between the time domain delay position and a reference position, where the reference position is a delay position of an orthogonal basis carried by a CSI-RS.

In an embodiment of this application, the information pair in the first information pair set includes one piece of the third information and a spatial domain orthogonal basis carried on a CSI-RS port corresponding to one CSI-RS port index;
or
the information pair in the first information pair set includes one piece of the third information and a joint spatial-frequency orthogonal basis carried on a CSI-RS port corresponding to one CSI-RS port index.

In an embodiment of this application, the CSI-RS port index is less than a maximum valid CSI-RS port index indicated by the first information.

In an embodiment of this application, the information pair in the first information pair set includes one joint spatial-frequency orthogonal basis index.

In an embodiment of this application, the joint spatial-frequency orthogonal basis index is less than a joint spatial-frequency orthogonal basis index indicated by the first information.

In an embodiment of this application, a set consisting of the one or more target information pairs is a subset of the first information pair set.

In an embodiment of this application, the second information includes:

a bitmap, where an indication bit in the bitmap is used to indicate an information pair including the first information and the third information;

or
an index of an information pair including the first information and the third information.

In an embodiment of this application, if the first information includes the maximum valid port index, the third information corresponding to different valid ports is the same or different.

The apparatus provided in this embodiment of this application can implement the processes that are implemented in the method embodiment shown in FIG. 2, with the same technical effects achieved. To avoid repetition, details are not described herein again.

Figure 11:
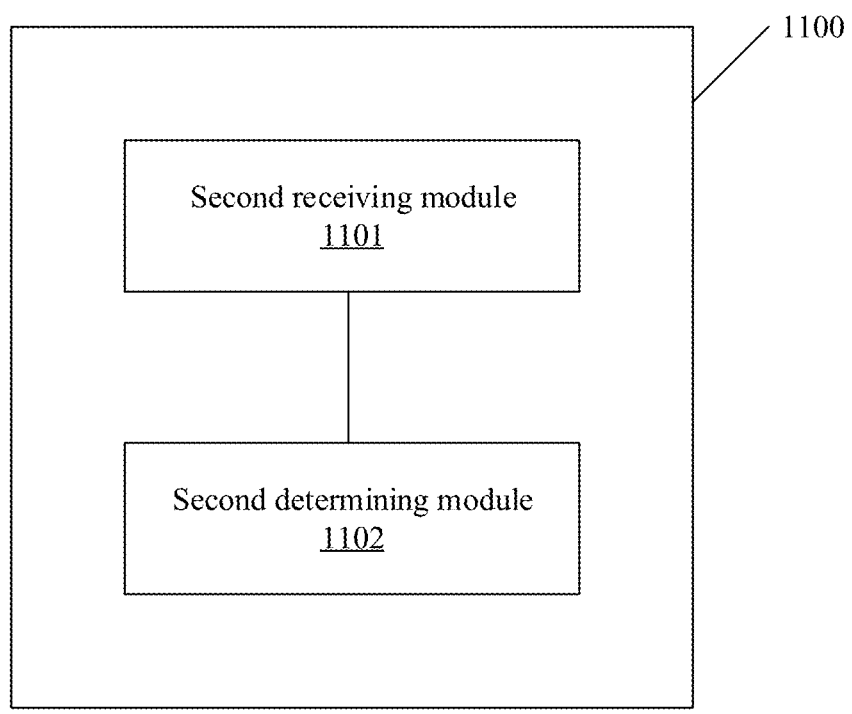
FIG. 11 is a second schematic diagram of a transmission apparatus according to an embodiment of this application.

Referring to FIG. 11, an embodiment of this application provides a transmission apparatus. The apparatus 1100 includes:
- a second receiving module 1101, configured to receive information for determining a position of a valid orthogonal basis and a coefficient of the valid orthogonal basis that are sent by a terminal; and
- a second determining module 1102, configured to determine precoding for downlink transmission based on the information for determining the position of the valid orthogonal basis and the coefficient of the valid orthogonal basis.

Optionally, the information for determining the position of the valid orthogonal basis includes one or more of first information, second information, and third information.

The first information includes a maximum valid port index and/or a maximum valid joint spatial-frequency orthogonal basis index.
the second information is used to indicate one or more target information pairs selected from a first information pair set, where the first information pair set includes a plurality of information pairs including the first information and the third information; and the third information includes a result selected by the terminal from frequency domain orthogonal basis related information that is indicated by the network side or agreed upon in a protocol.

In an embodiment of this application, the second determining module 1102 is further configured to: determine a valid joint spatial-frequency orthogonal basis based on the first information and the second information; and determine the precoding for the downlink transmission based on the valid joint spatial-frequency orthogonal basis and the coefficient of the valid orthogonal basis.

In an embodiment of this application, the apparatus 1000 further includes:
- a second sending module, configured to send first indication information, where the first indication information indicates the terminal to send one or more of the first information, the second information, or the third information.

In an embodiment of this application, the second determining module 1102 is further configured to: determine a valid spatial domain orthogonal basis and a valid frequency domain orthogonal basis based on the first information, the second information, and the third information; and determine the precoding for the downlink transmission based on the coefficient of the valid orthogonal basis, the valid spatial domain orthogonal basis, and the valid frequency domain orthogonal basis.

In an embodiment of this application, the apparatus 1000 further includes:
- a third sending module, configured to send second indication information, where the second indication information is used to indicate the frequency domain orthogonal basis related information.

In an embodiment of this application, the frequency domain orthogonal basis related information includes one or more of a frequency domain resource position, a time domain delay position, a delay position difference, a corresponding DFT vector, and a difference between the time domain delay position and a reference position, where the reference position is a delay position of an orthogonal basis carried by a CSI-RS.

In an embodiment of this application, the information pair in the first information pair set includes one piece of the third information and a spatial domain orthogonal basis carried on a CSI-RS port corresponding to one CSI-RS port index;
or
the information pair in the first information pair set includes one piece of the third information and a joint spatial-frequency orthogonal basis carried on a CSI-RS port corresponding to one CSI-RS port index.

In an embodiment of this application, the CSI-RS port index is less than a maximum valid CSI-RS port index indicated by the first information.

In an embodiment of this application, the information pair in the first information pair set includes one joint spatial-frequency orthogonal basis index.

In an embodiment of this application, the joint spatial-frequency orthogonal basis index is less than a joint spatial-frequency orthogonal basis index indicated by the first information.

In an embodiment of this application, a set consisting of the one or more target information pairs is a subset of the first information pair set.

In an embodiment of this application, the second information includes:
- a bitmap, where an indication bit in the bitmap indicates an information pair including the first information and the third information;
or
- an index of an information pair including the first information and the third information.

In an embodiment of this application, the apparatus 1100 further includes:
- a third determining module, configured to determine an orthogonal basis corresponding to a CSI-RS port;
- a fourth determining module, configured to encode a CSI-RS by using the orthogonal basis to obtain a first CSI-RS; and
- a fourth sending module, configured to send the first CSI-RS via the CSI-RS port.

In an embodiment of this application, if the first information includes the maximum valid port index, the third information corresponding to different valid ports is the same or different.

The apparatus provided in this embodiment of this application can implement the processes that are implemented in the method embodiment shown in FIG. 3, with the same technical effects achieved. To avoid repetition, details are not described herein again.

Figure 12:
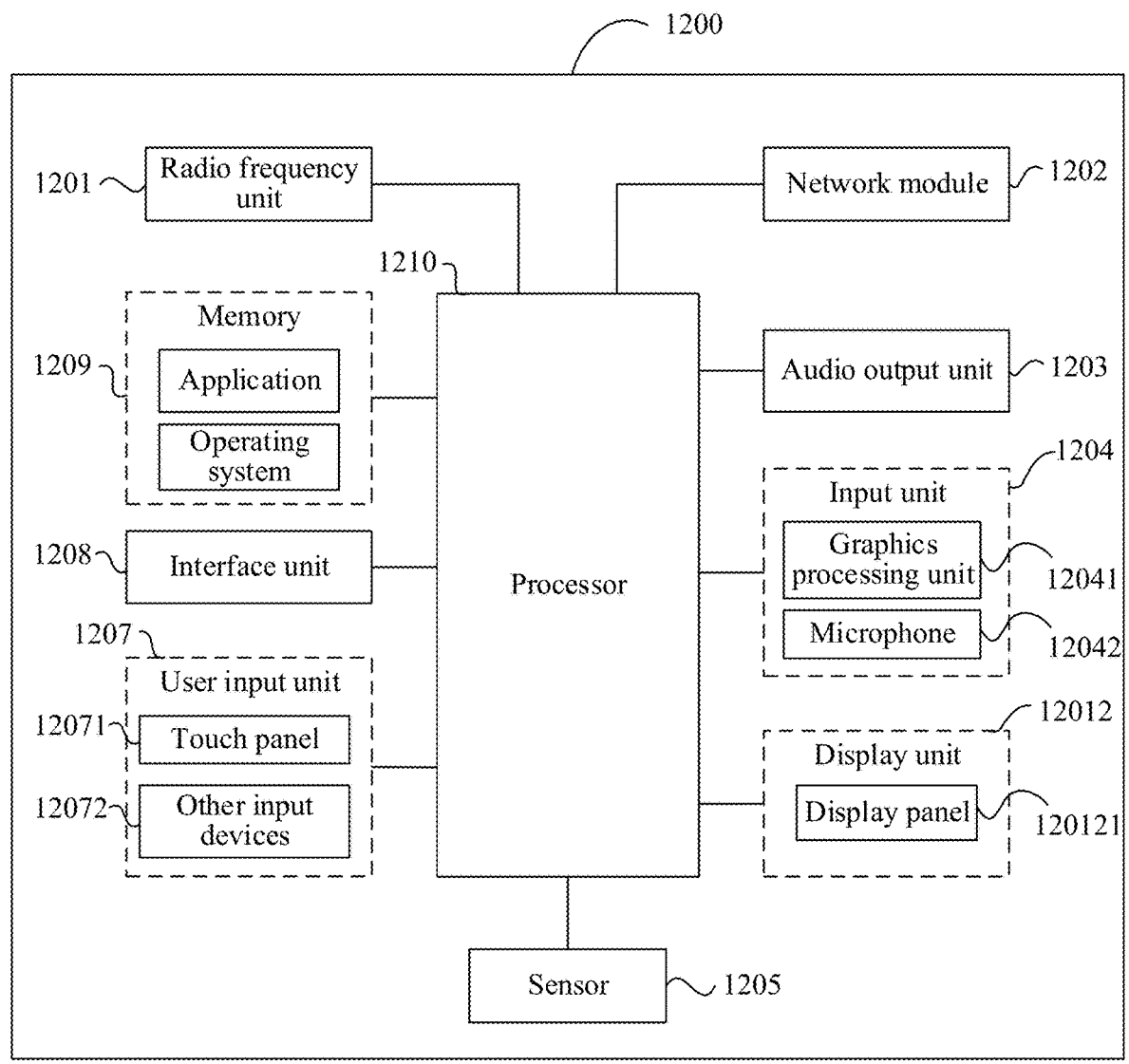
FIG. 12 is a schematic diagram of a terminal according to an embodiment of this application.

FIG. 12 is a schematic diagram of a hardware structure of a terminal for implementing an embodiment of this application. The terminal 1200 includes, but is not limited to, components such as a radio frequency unit 1201, a network module 1202, an audio output unit 1203, an input unit 1204, a sensor 1205, a display unit 1206, a user input unit 1207, an interface unit 1208, a memory 1209, and a processor 1210.

Persons skilled in the art may understand that the terminal 1200 may further include a power supply (for example, a battery) that supplies power to various components. The power supply may be logically connected to the processor 1210 via a power management system, so that functions such as charging and discharging management and power consumption management are implemented by using the power management system. The terminal structure shown in FIG. 12 does not constitute a limitation to the terminal. The terminal may include more or fewer components than those shown in the figure, or some components may be combined, or there may be a different component arrangement. Details are not described herein.

It should be understood that in an embodiment of this application, the input unit 1204 may include a graphics processing unit (GPU) 12041 and a microphone 12042. The graphics processing unit 12041 processes image data of a still image or a video obtained by an image capturing apparatus (for example, a camera) in a video capturing mode or an image capturing mode. The display unit 1206 may include a display panel 12061, and the display panel 12061 may be configured in the form of liquid crystal display, organic light-emitting diode, or the like. The user input unit 1207 includes a touch panel 12071 and other input devices 12072. The touch panel 12071 is also referred to as a touch screen. The touch panel 12071 may include two parts: a touch detection apparatus and a touch controller. The other input devices 12072 may include but are not limited to a physical keyboard, a functional button (such as a volume control button or a power on/off button), a trackball, a mouse, and a joystick. Details are not described herein.

In an embodiment of this application, the radio frequency unit 1201 receives downlink data from a network-side device, and then sends the downlink data to the processor 1210 for processing. In addition, uplink data is sent to the network-side device. Generally, the radio frequency unit 1201 includes, but is not limited to, an antenna, at least one amplifier, a transceiver, a coupler, a low noise amplifier, a duplexer, and the like.

The memory 1209 may be configured to store software programs or instructions and various data. The memory 1209 may mainly include a program or instruction storage area and a data storage area. The program or instruction storage area may store an operating system, an application program or instructions required by at least one function (for example, a sound playing function and an image playing function), and the like. In addition, the memory 1209 may include a high-speed random access memory, or may include a non-volatile memory. The non-volatile memory may be a read-only memory (ROM), a programmable read-only memory (Programmable ROM, PROM), an erasable programmable read-only memory (Erasable PROM, EPROM), an electrically erasable programmable read-only memory (Electrically EPROM, EEPROM), or a flash memory. For example, the memory may be at least one magnetic disk storage device, a flash memory device, or another non-volatile solid-state storage device.

The processor 1210 may include one or more processing units. Optionally, the processor 1210 may integrate an application processor and a modem processor. The application processor mainly processes an operating system, a user interface, an application program or instructions, and the like. The modem processor, such as a baseband processor, mainly processes wireless communication. It should be understood that alternatively, the modem processor may not be integrated into the processor 1210.

The terminal provided in this embodiment of this application can implement the processes that are implemented in the method embodiment shown in FIG. 2, with the same technical effects achieved. To avoid repetition, details are not described herein again.

Figure 13:
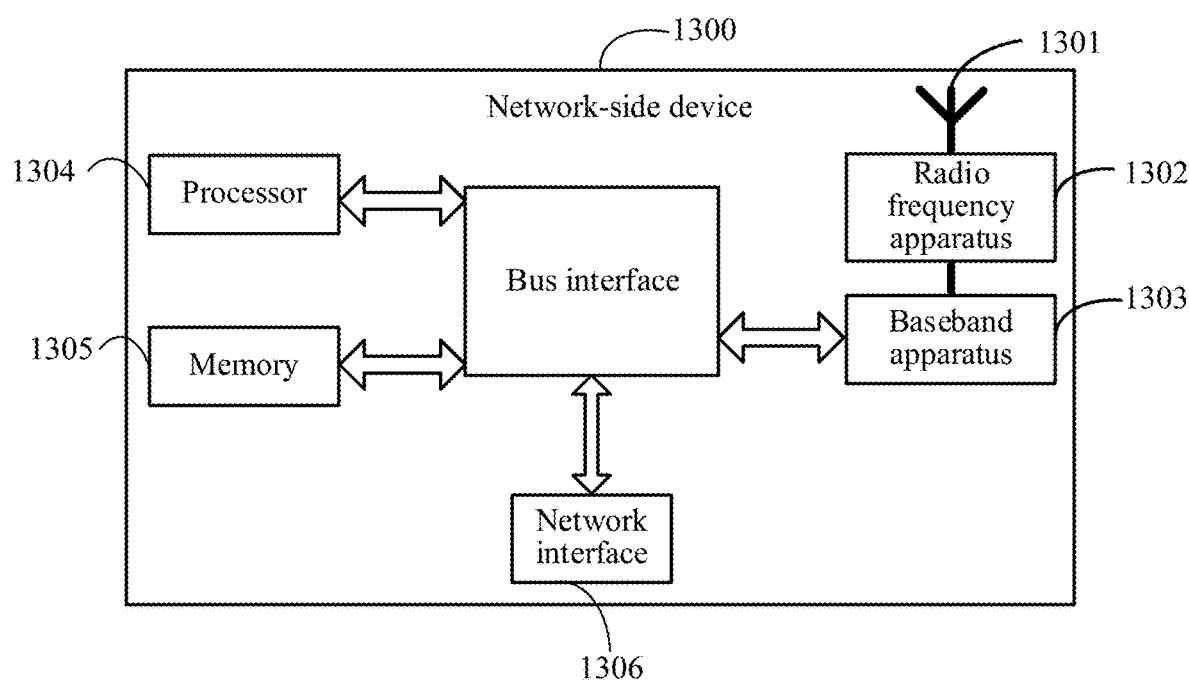
FIG. 13 is a schematic diagram of a network-side device according to an embodiment of this application.

An embodiment of this application further provides a network-side device. As shown in FIG. 13, a network-side device 1300 includes an antenna 1301, a radio frequency apparatus 1302, and a baseband apparatus 1303. The antenna 1301 is connected to the radio frequency apparatus 1302. In the uplink direction, the radio frequency apparatus 1302 receives information through the antenna 1301, and sends the received information to the baseband apparatus 1303 for processing. In the downlink direction, the baseband apparatus 1303 processes information to be sent and sends the information to the radio frequency apparatus 1302, and the radio frequency apparatus 1302 processes the received information and then sends the information through the antenna 1301.

The foregoing band processing apparatus may be located in the baseband apparatus 1303, and the method performed by the network-side device in the foregoing embodiment may be implemented in the baseband apparatus 1303. The baseband apparatus 1303 includes a processor 1304 and a memory 1305.

The baseband apparatus 1303 may include, for example, at least one baseband board, and a plurality of chips are arranged on the baseband board. As shown in FIG. 13, one of the chips is, for example, the processor 1304, which is connected to the memory 1305, to invoke a program in the memory 1305, so as to perform the operations of the network device shown in the foregoing method embodiment.

The baseband apparatus 1303 may further include a network interface 1306 for exchanging information with the radio frequency apparatus 1302. The interface is, for example, a common public radio interface (CPRI).

Specifically, the network-side device in this embodiment of this application further includes instructions or programs stored on the memory 1305 and capable of running on the processor 1304. The processor 1304 invokes the instructions or programs in the memory 1305 to perform the method that is performed by the modules shown in FIG. 11, with the same technical effects achieved. To avoid repetition, details are not described herein again.

An embodiment of this application further provides a program product. The program product is stored in a non-volatile storage medium, and the program product is executed by at least one processor to implement the steps of the method of processing described in FIG. 2 or FIG. 3.

An embodiment of this application further provides a readable storage medium. The readable storage medium stores programs or instructions, and when the programs or instructions are executed by a processor, the processes of the foregoing method embodiment shown in FIG. 2 or FIG. 3 are implemented, with the same technical effects achieved. To avoid repetition, details are not described herein again.

The processor is a processor in the terminal described in the foregoing embodiment. The readable storage medium includes a computer-readable storage medium, such as a computer read-only memory (ROM), a random access memory (RAM), a magnetic disk, or a compact disc.

An embodiment of this application further provide a chip. The chip includes a processor and a communication interface, the communication interface and the processor are coupled to each other, and the processor is configured to run programs or instructions of a network-side device to implement the processes of the foregoing method embodiment shown in FIG. 2 or FIG. 3, with the same technical effects achieved. To avoid repetition, details are not described herein again.

It should be understood that the chip mentioned in this embodiment of this application may also be referred to as a system-on-chip, a system chip, a chip system, a system on a chip, or the like.

It should be noted that, in the specification, the terms "include", "comprise", or any of their variants are intended to cover a non-exclusive inclusion, so that a process, a method, an article, or an apparatus that includes a series of elements not only includes those elements but also includes other elements that are not expressly listed, or further includes elements inherent to such a process, method, article, or apparatus. In the absence of more restrictions, an element defined by "including a . . . " does not exclude another same element in a process, method, article, or apparatus that includes the element. In addition, it should be noted that the scope of the method and apparatus in the embodiments of this application is not limited to performing functions in the order shown or discussed, but may also include performing the functions substantially at the same time or in reverse order depending on the functions involved. For example, the described methods may be performed in an order different from that described, and various steps may also be added, omitted, or combined. In addition, features described with reference to some examples may be combined in other examples.

Through the description of the foregoing embodiments, persons skilled in the art can clearly understand that the method of the foregoing embodiments can be implemented by means of software combined with a necessary universal hardware platform, and certainly, can also be implemented through hardware, but in many cases, the former is a better implementation. Based on such an understanding, the technical solutions of this application essentially or the part contributing to the prior art may be implemented in the form of a software product. The computer software product is stored in a storage medium (such as a ROM/RAM, a magnetic disk, or an optical disc), and includes several instructions for instructing a terminal (which may be a mobile phone, a computer, a server, an air conditioner, a network device, or the like) to perform the methods described in the embodiments of this application.

The embodiments of this application are described above with reference to the accompanying drawings, but this application is not limited to the foregoing specific implementations. The foregoing specific implementations are merely illustrative instead of restrictive. Under the enlightenment of this application, persons of ordinary skills in the art may make many forms without departing from the essence of this application and the scope of protection of claims, all of which fall within the protection of this application.

What is claimed is:

1. A transmission method, comprising:
   sending, by a terminal, information for determining a position of a valid orthogonal basis and a coefficient of the valid orthogonal basis to a network side; wherein the information for determining the position of the valid orthogonal basis comprises at most two of spatial domain orthogonal basis, bitmap, or delay position;
   wherein the method further comprises:
   receiving, by the terminal, first indication information, wherein the first indication information indicates the terminal to send the delay position and the bitmap, and the first indication information also indicates the terminal not to send the spatial domain orthogonal basis;
   the sending, by the terminal, the information for determining the position of the valid orthogonal basis to the network side comprises:
   sending, by the terminal, the delay position and the bitmap to the network side; or sending, by the terminal, only the delay position to the network side, without sending the bitmap to the network side.

2. The method according to claim 1, wherein the information for determining the position of the valid orthogonal basis further comprises one or more of first information, second information, or third information; wherein
   the first information comprises a maximum valid port index and/or a maximum valid joint spatial-frequency orthogonal basis index;
   the second information is used to indicate one or more target information pairs selected from a first information pair set, wherein the first information pair set comprises a plurality of information pairs comprising the first information and the third information; and
   the third information comprises a result selected by the terminal from frequency domain orthogonal basis related information that is indicated by the network side or agreed upon in a protocol.

3. The method according to claim 2, wherein the first indication information further indicates that the terminal is to send one or more of the first information, the second information, or the third information.

4. The method according to claim 2, wherein the frequency domain orthogonal basis related information comprises one or more of a frequency domain resource position, a corresponding discrete Fourier transform (DFT) vector, or a difference between the time domain delay position and a reference position, wherein the reference position is a delay position of an orthogonal basis carried by a channel state information reference signal (CSI-RS).

5. The method according to claim 2, wherein the information pair in the first information pair set comprises one piece of the third information and a joint spatial-frequency orthogonal basis carried on a channel state information reference signal (CSI-RS) port corresponding to one CSI-RS port index.

6. The method according to claim 2, wherein the second information comprises:
   an index of an information pair comprising the first information and the third information.

7. The method according to claim 1, wherein an indicator bit in the bitmap is used to indicate the information pair consisting of the spatial domain orthogonal basis and the delay position.

8. The method according to claim 1, wherein the delay position comprises a delay position difference.

9. A transmission method, comprising:
   receiving, by a network-side device, information for determining a position of a valid orthogonal basis and a coefficient of the valid orthogonal basis that are sent by a terminal; wherein the information for determining the position of the valid orthogonal basis comprises at most two of spatial domain orthogonal basis, bitmap, or delay position; and
   determining, by the network-side device, precoding for downlink transmission based on the information for determining the position of the valid orthogonal basis and the coefficient of the valid orthogonal basis;

wherein the method further comprises:
sending, by the network-side, first indication information, wherein the first indication information indicates the terminal to send the delay position and the bitmap, and the first indication information also indicates the terminal not to send the spatial domain orthogonal basis;
the receiving, by the network-side device, the information for determining the position of the valid orthogonal basis sent by the terminal comprises:
receiving, by the network-side device, the delay position and the bitmap sent by the terminal; or receiving, by the network-side device, the delay position sent by the terminal.

10. The method according to claim 9, wherein the information for determining the position of the valid orthogonal basis further comprises one or more of first information, second information, or third information; wherein
the first information comprises a maximum valid port index and/or a maximum valid joint spatial-frequency orthogonal basis index; and
the second information is used to indicate one or more target information pairs selected from a first information pair set, wherein the first information pair set comprises a plurality of information pairs comprising the first information and the third information; and the third information comprises a result selected by the terminal from frequency domain orthogonal basis related information that is indicated by the network side or agreed upon in a protocol.

11. The method according to claim 10, wherein the first indication information further indicates that the terminal is to send one or more of the first information, the second information, or the third information.

12. The method according to claim 10, wherein the method further comprises:
sending, by the network-side device, second indication information, wherein the second indication information indicates the frequency domain orthogonal basis related information.

13. The method according to claim 10, wherein the determining, by the network-side device, precoding for downlink transmission based on the information for determining the position of the valid orthogonal basis and the coefficient of the valid orthogonal basis comprises:
determining, by the network-side device, a valid joint spatial-frequency orthogonal basis based on the first information and the second information; and
determining, by the network-side device, the precoding for downlink transmission based on the valid joint spatial-frequency orthogonal basis and the coefficient of the valid orthogonal basis.

14. The method according to claim 10, wherein the determining, by the network-side device, precoding for downlink transmission based on the information for determining the position of the valid orthogonal basis and the coefficient of the valid orthogonal basis comprises:
determining, by the network-side device, a valid spatial domain orthogonal basis and a valid frequency domain orthogonal basis based on the first information, the second information, and the third information; and
determining, by the network-side device, the precoding for downlink transmission based on the coefficient of the valid orthogonal basis, the valid spatial domain orthogonal basis, and the valid frequency domain orthogonal basis.

15. The method according to claim 10, wherein the frequency domain orthogonal basis related information comprises one or more of a frequency domain resource position, a corresponding (DFT) vector, or a difference between the time domain delay position and a reference position, wherein the reference position is a delay position of an orthogonal basis carried by a channel state information reference signal (CSI-RS).

16. The method according to claim 10, wherein the information pair in the first information pair set comprises one piece of the third information and a joint spatial-frequency orthogonal basis carried on a CSI-RS port corresponding to one channel state information reference signal (CSI-RS) port index.

17. The method according to claim 9, wherein an indicator bit in the bitmap is used to indicate the information pair consisting of the spatial domain orthogonal basis and the delay position.

18. The method according to claim 9, wherein the delay position comprises a delay position difference.

19. A terminal, comprising: a processor, a memory, and a program stored on the memory and capable of running on the processor, wherein the program, when being executed by the processor, implements:
sending information for determining a position of a valid orthogonal basis and a coefficient of the valid orthogonal basis to a network side, wherein the information for determining the position of the valid orthogonal basis comprises at most two of spatial domain orthogonal basis, bitmap, or delay position;
wherein the program is executed by the processor to further implement:
receiving first indication information, wherein the first indication information indicates the terminal to send the delay position and the bitmap, and the first indication information also indicates the terminal not to send the spatial domain orthogonal basis;
the sending the information for determining the position of the valid orthogonal basis to the network side comprises:
sending the delay position and the bitmap to the network side; or only sending the delay position to the network side, without sending the bitmap to the network side.

20. A network-side device, comprising: a processor, a memory, and a program stored on the memory and capable of running on the processor, wherein when the program is executed by the processor, the steps of the method according to claim 9 are implemented.

* * * * *